Feb. 1, 1927.

R. W. ALLERTON

PUMP

Original Filed Aug. 10, 1923

1,616,072

Inventor
Robert W. Allerton
By his Attorneys

Patented Feb. 1, 1927.

1,616,072

UNITED STATES PATENT OFFICE.

ROBERT W. ALLERTON, OF SOUTH ORANGE, NEW JERSEY, ASSIGNOR TO WORTHINGTON PUMP AND MACHINERY CORPORATION, OF NEW YORK, N. Y., A CORPORATION OF VIRGINIA.

PUMP.

Application filed August 10, 1923, Serial No. 656,645. Renewed July 1, 1926.

This invention relates to improvements in pumps.

It is one object of the present invention to provide an improved high pressure pump, of the duplex double-acting type, in which the plunger chambers, suction and discharge passages and valve bores, are all formed in a single block of metal. It is a further object to provide an improved valve service for such pump, whereby each valve bore is arranged to contain a suction and a discharge valve the seats and cages for such valves being held in the bores in a novel manner so as to be wholly independent of each other for support. In the present arrangement, also, the cylinders are preferably undercut around liners positioned therein so that one or more of the valve openings may be located in such undercut area and be freely accessible for passage of liquid therethrough whereby a shorter billet may be used for the pump body than otherwise would be the case.

While the pump of the present invention is intended for use generally in high pressure work where a solid metal body is desirable in that it provides for a minimum number of openings subject to danger of leakage, the present construction will also be found of great value in handling hot liquids, such, for example, as are encountered in the production of gasoline from heavier petroleum products under modern cracking processes, as the comparatively small number of joints, such as those at the cylinder heads, piston rod stuffing box and valve bore sealing devices, present in the pump and which are more or less subject to leakage due to different coefficients of expansion of the metal in contact with the hot oil, will have a tendency to greatly reduce danger of leakage, while the design of such joints and their accessibility is such that leakage thereat may readily and quickly be taken care of while the pump is in operation. In hot liquid use, also, the independent mounting of a suction and a discharge valve in each valve bore so as to be independent of each other for support, will enable quick repairs to be made thereto, and such valves and their seats will of course be formed of materials having the characteristic of high thermal resistance. When designed for hot oil use, the pump will preferably be provided with a novel form of piston rod stuffing box, in which suitable provision will be made not only for return to the pump cylinder of oil leaking along the piston rod before it reaches the outer end of the stuffing box or the stuffing box packing, but also for keeping down the temperature of that part of the piston rod which is exposed to the atmosphere, and for this purpose the length of the stuffing box is such that the part of the piston rod which is in direct contact with the hot oil in the plunger chamber will not be exposed to the atmosphere. whereby danger of firing of oil thereon by exposure to air will be avoided.

To enable others skilled in the art to understand the invention, the same will now be described in detail in connection with the accompanying drawings showing a preferred embodiment thereof, and the novel features of the invention will then be pointed out in the claims.

In the drawings—

Figure 1:
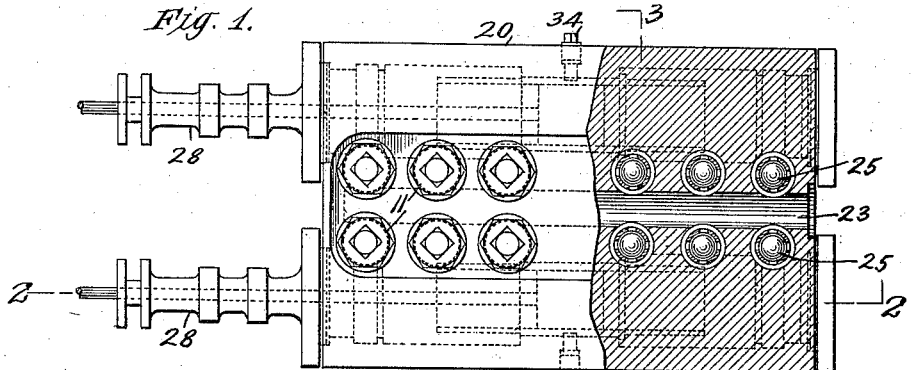
Figure 1 is a top plan view, partly in section, of the improved pump.
Figure 2:
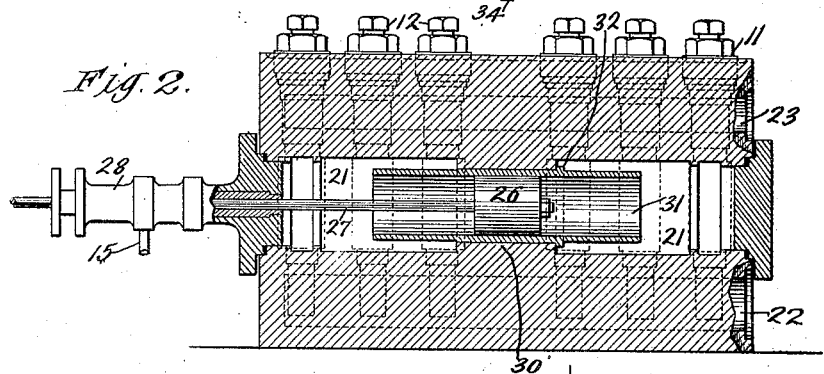
Figure 2 is a section on the line 2—2 of Fig. 1.

Referring now to the drawings, the pump comprises a body portion 20 formed of a metal block, preferably forged steel, of approximately rectangular shape. The length of this block will depend, of course, upon the length of the plunger stroke and also upon the number of suction and discharge valves to be employed. In the present arrangement, such valves are located in bores arranged in alined rows and at such point in the metal block 20 as to cut through plunger chambers 21 and inlet and discharge passages 22, 23, respectively, such valve bores being shown as arranged at right angles to the plunger chambers and the inlet and discharge passages. In the present showing, also, three suction valves 24 and three discharge valves 25 are provided on each side of each of the double-acting plungers 26, a suction valve and a discharge valve being located in alinement in each valve bore. The plungers are actuated by piston rods 27 extending through stuffing boxes 28, the design of which as shown is especially intended for use with hot oil or like liquids, and will be hereafter described.

As stated, the cylinder bores 21 are preferably arranged side by side, or on the same horizontal plane, with a diaphragm 29 therebetween, and on each side of a central portion 30 these bores are undercut around liners 31 of proper length, such liners being supported at the central portion 30 of such bores. The liners 31 may be correctly positioned and held against longitudinal movement in at least one direction by a peripheral flange 32 formed thereon, such flange abutting against the portion 30, while set screws 34, adjustable from a point outside of the metal block 20, are also provided for holding the liners 21 against longitudinal movement in the opposite direction and are rigidly held in position and against rotary movement thereby. Under cutting of the plunger chambers around the liners 31 as above described provides additional space within such chambers and thereby enables a much shorter billet to be used than otherwise would be the case, as one or more of the suction and discharge valve bores may be positioned so as to open within such undercut area and still provide for free flow of liquid through such openings.

Figure 3:
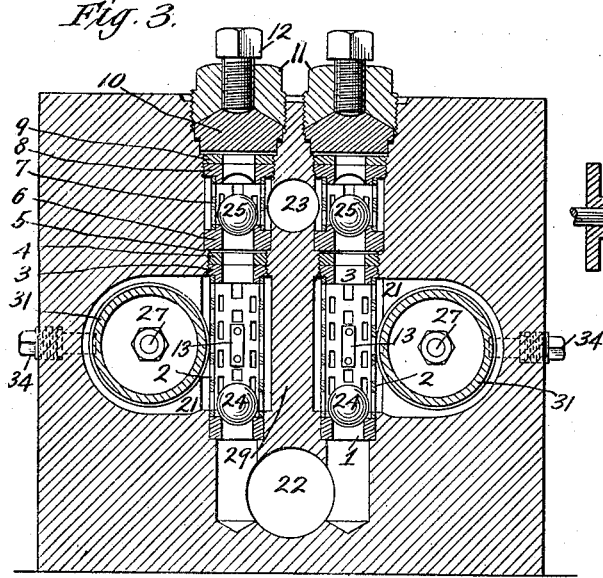
Figure 3 is a section on the line 3—3 of Fig. 1.

Although it will be understood that any desired number of suction and discharge valves may be employed, as shown the present pump has three suction valves and three discharge valves for each end of the double-acting plungers. It will be understood, however, that the invention may be applied in single-acting pumps. The suction valve construction comprises a seat 1 of usual construction positioned in the valve bore which cuts through the inlet passage 22 (Fig. 3), the ball valve 24 thereof, above referred to, being held in a cage 2 resting on such seat and held down by a threaded collar 3 and annular lock nut 4. The valve bore above the lock nut 4 is slightly larger than the diameter of the suction valve bore, so as to provide an annular shoulder 5 on which the seat 6 for the ball 25 of the discharge valve rests. The ball of this valve is also provided with a cage 7 arranged to hold the valve seat 6 down by engagement of cage 7 therewith which is held in place by a threaded collar 8 and an annular lock nut 9. The top or outer portion of the valve bore above such discharge valve is also preferably closed by a packed plug 10 held by a threaded plug 11 and screw 12. The cages of the suction valves are preferably provided with valve stops 13 which may be so positioned and of such length as to function with the cages inserted with either end up.

In case of leakage, it will be obvious that the plug 10 may be tighteend by screw 12 and thereby adjust the packing. By this construction, with a suction and a discharge valve in each bore, repairs to the pump are greatly facilitated and the number of openings in the metal body of the pump where leakage is to be guarded against is reduced and any such leakage can also be readily corrected. By mounting these valves independently of each other, the discharge valves may be withdrawn for repair without disturbing the suction valves, and repairs further facilitated.

Figure 4:
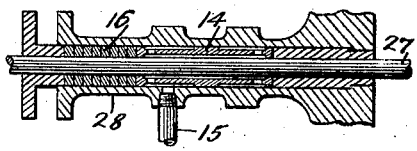
Figure 4 is a longitudinal central section of the improved stuffing box.

Referring now particularly to Fig. 4, the stuffing box shown at 28, above referred to, which is secured to the pump body in the usual manner, may advantageously be employed in a pump such as above described, especially when used for hot oil work. In the construction shown, the stuffing box is of a length proportionate to the stroke of the pump so that the part of the plunger rod 27 which comes into contact with the hot oil in the plunger chamber will not be exposed to contact with the atmosphere on the outstrokes of the plunger rods. Such stuffing boxes, also, are preferably provided with an open sleeve or lantern gland 14 between the packing and pump chamber. Communicating with the outer end of the chamber formed by the sleeve or lantern gland 14 there is preferably provided a cold oil connection 15, whereby cold oil may be maintained in such chamber under a pressure preferably higher than that within the plunger chamber. Whatever leakage of oil there may be, therefore, is of the cold oil along the plunger rod into the plunger chamber, so that the packing 16, located between the outer end of the stuffing box and such cold oil chamber, is required to prevent leakage of cold oil only. With this construction, danger of firing of hot oil leaking past the stuffing box packing is avoided, and the hot part of the piston rod which is in direct contact with the hot oil in the plunger chamber is not exposed to the atmosphere nor does it come in contact with the packing. This stuffing box construction forms the subject matter of a separate application Serial No. 731,539, filed Aug. 12, 1924.

It will be understood that various changes may be made in the details of construction herein shown and described, while still retaining the invention defined by the claims.

What is claimed is:

1. A pump formed of a metal block having a plunger chamber and suction and discharge passages formed therein, a plunger arranged to operate in said chamber, a valve bore cutting through the side of said plunger chamber and said suction and discharge passages, and suction and discharge valves arranged in said valve bore.

2. A pump formed of a metal block having a plunger chamber formed therein, suction and discharge passages arranged parallel to said plunger chamber, a plunger arranged to operate in said chamber, valve bores cutting through the side of said plunger chamber and said suction and discharge passages, and suction and discharge valves arranged in said valve bores.

3. A pump comprising a one-piece metal body having parallel plunger chambers formed therein, suction and discharge passages parallel with and between said plunger chambers, plungers in said plunger chambers, valve bores between the plunger chambers and passages and cutting through said plunger chambers and said suction and discharge passages, and a suction and discharge valve arranged in each of said valve bores.

4. A pump comprising a one-piece metal body having plunger chambers formed therein, double-acting plungers in said chambers, suction and discharge passages arranged parallel with and between said plunger chambers, a plurality of valve bores for each end of each chamber arranged between said plunger chambers and passages and cutting through said plunger chambers and said suction and discharge passages, and suction and discharge valves located in said valve bores.

5. A pump comprising a one-piece metal body having a plunger chamber and suction and discharge passages formed therein, a plunger arranged to operate in said plunger chamber, a valve bore cutting through said plunger chamber and said suction and discharge passages, suction and discharge valves arranged in said valve bore, and means for securing said valves in place independently of each other.

6. A pump formed of a metal block and having valve bores cut partially through the block, a suction and discharge valve in each of said bores, plugs 10 closing said bores, and threaded plugs 11 outside said plugs carrying screws 12 engaging said plugs 10.

7. A pump formed of a metal block and having a valve bore, suction valve seat 1 and suction valve cage 2 in said bore, threaded sleeve 3 holding said cage, a shoulder on said bore outside the sleeve, discharge valve seat 6 and valve cage 7 supported by said shoulder, and means for holding cage 7 in place and closing the valve bore.

In testimony whereof, I have hereunto set my hand.

ROBERT W. ALLERTON.